Patented Feb. 1, 1944

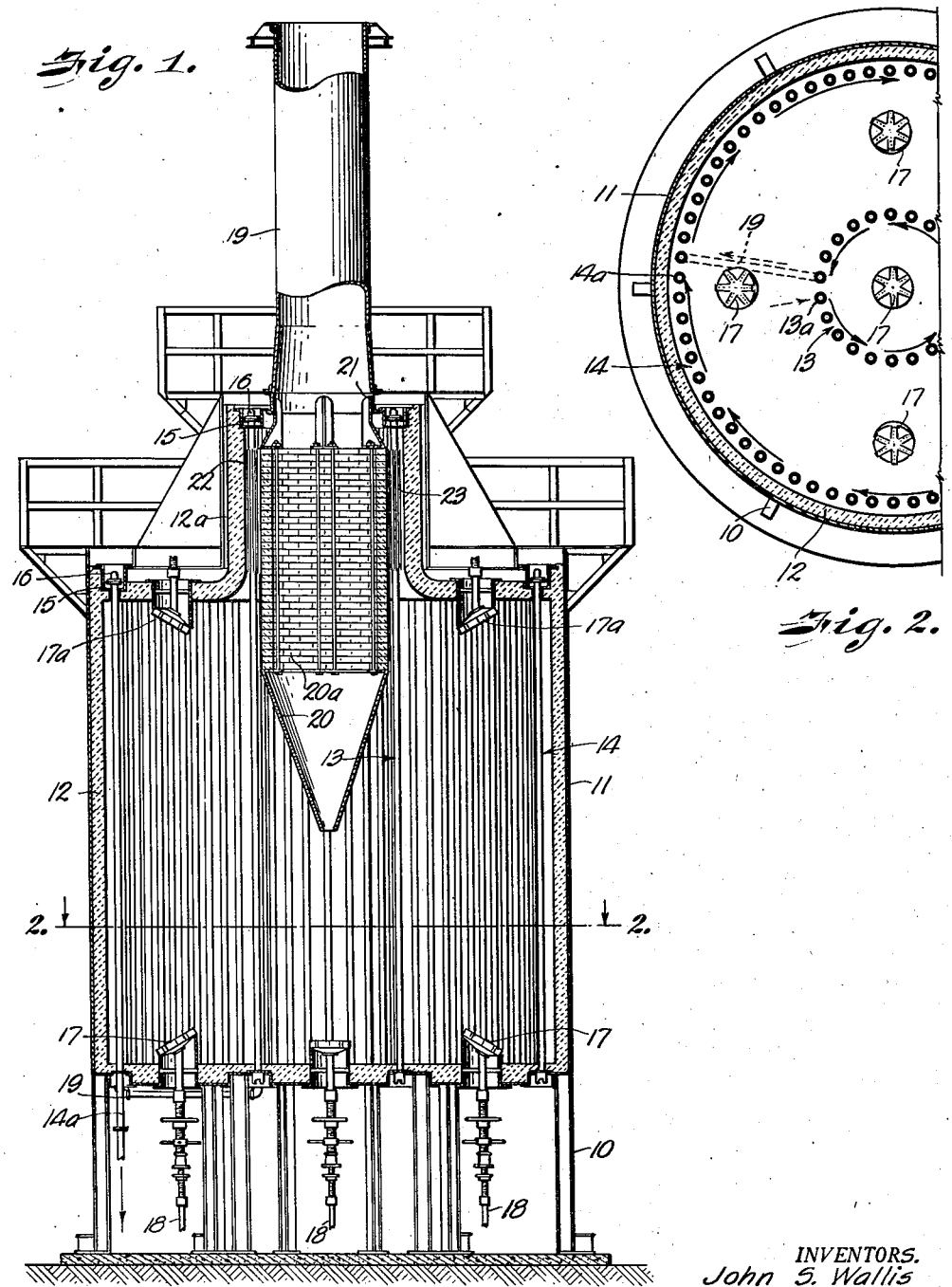

2,340,289

UNITED STATES PATENT OFFICE 2,340,289

FURNACE CONSTRUCTION

John S. Wallis, Darien, and John W. Throckmorton, Wilton, Conn., assignors to Petro-Chem Development Company, New York, N. Y., a corporation of Delaware Application September 11, 1942, Serial No. 458,048

3 Claims. (Cl. 122—356)

Our invention relates to new and useful improvements in furnace construction.

The invention particularly contemplates vertical tubular furnaces of the type used in the heating of fluids such as the distillation or cracking of petroleum hydrocarbons, heating of chemicals and water, steam or like products. Furnaces of this type are provided with a combustion chamber which encloses a bank or banks of heat exchange tubes. The heat exchange tubes form one or more continuous passages for fluid to be heated. Heating gases produced by the burning of combustible fuels are supplied to the combustion chamber by burners arranged to distribute the heat uniformly within the furnace. The heating gases introduced into the combustion chamber circulate around the tubes and are discharged through a stack or flue passage opening from the top of the furnace. The fluid supplied to the inlet tube enters the furnace in a relatively cool condition and is passed through the heat exchange tubes where it absorbs heat from the combustion gases and is discharged from the furnace in a relatively heated state or condition.

Manifestly, it is desirable to construct the furnace so that a maximum amount of heat is absorbed from the gases as they pass through the combustion chamber.

We have developed a furnace construction that is highly efficient in operation to absorb heat from the gases. Heat exchange tubes are arranged in concentric inner and outer circular banks. The inner bank is provided with a fluid inlet, the outer bank is provided with a fluid outlet, and the two banks are interconnected. Fluid entering the furnace will first traverse the inner bank of tubes and then the outer bank of tubes so that the cooler fluid will flow through the inner bank of tubes and the more highly heated fluid through the outer bank of tubes.

A cone is suspended in the upper portion of the combustion chamber and within the compass of the inner bank of tubes for reflecting radiant heat toward the portions of the tubes extending through the lower or radiant section of the combustion chamber and for deflecting the combustion gases around the portions of the tubes extending through the cooler upper or convection section of the chamber. A cylindrical baffle surmounting the cone projects into the flue passage and cooperates with the wall of the passage to provide a narrow annular space. The tubes of the inner bank are longer than the tubes of the outer bank and their upper ends extend into the annular space. Radial fins may be used on the upper portions of the tubes to provide exchange surfaces for increasing heat absorption.

All of the combustion gases from the combustion chamber pass through the annular space and about the heat exchange tubes positioned therein. Since the coolest fluid is flowing through these tubes, the maximum amount of heat is recovered from the flue gas. Thus, a low flue gas temperature is obtained resulting in a highly efficient furnace.

By the double bank tube arrangement, including the circulation of fluid first through the inner bank and thence through the outer bank, together with the directing of the flame of the burners between the inner and outer banks in the desired direction, as well as the control of firing of the burners, it is possible to closely regulate and control the degree of heat absorption in different portions of the tube banks, thereby obtaining the desired temperature gradient through the furnace. For example, the burners within the inner bank may be fired to bring the fluid rapidly up to temperature and the outer burners fired at a variable rate according to their position and the direction of flame projection to obtain a rapidly increasing temperature gradient in the outer bank, or a low increasing temperature gradient or a relatively constant temperature to merely balance the heat absorption of reactions taking place in the fluid in this portion of the furnace.

An important object of our invention is the provision of a furnace construction wherein a maximum amount of heat is absorbed from the combustion gases.

Another object of our invention is to provide a furnace with heating surfaces and burners that are adjustable so that the heat absorption in different sections of the furnace can be regulated in accordance with pre-determined requirements.

Still another object of our invention is the provision of a furnace that is simple in construction so that the heat exchange tubes may be easily removed for cleaning or replacement.

Other objects and advantages of our invention will be apparent during the course of the following description.

In the drawing forming a part of this specification and wherein like numerals are employed to designate like parts throughout the same, Fig. 1 is a vertical sectional view of a tubular furnace embodying our invention, and Fig. 2 is a fragmentary transverse sectional view taken on the line 2—2 of Fig. 1.

In the accompanying drawing, wherein for the purpose of illustration is shown a preferred embodiment of our invention, the furnace is mounted upon a support 10 and comprises an outer cylindrical casing 11 of sheet metal lined with a refractory material 12. The space within the casing comprises a combustion chamber.

Enclosed within the combustion chamber is a circular inner bank of vertical heat exchange tubes designated generally by the numeral 13 and a circular outer bank of vertical heat exchange tubes designated generally by the numeral 14. As shown in Fig. 2, the outer bank of tubes 14 is disposed in proximity to the inner wall of the combustion chamber and the inner bank of tubes 13 is concentrically located within the outer bank of tubes. The heat exchange tubes preferably comprise U-shaped units having their open ends extending through the refractory material comprising the top of the combustion chamber and supported by U-shaped brackets 15. Adjacent ends of the respective units are connected by return bend headers 16. This construction permits the tubes to be easily cleaned in situ and removed for replacement or repair since it is only necessary to remove the headers 16 in order that the U-shaped units may be pulled vertically from the combustion chamber.

Extending through the refractory material forming the bottom of the furnace are a plurality of directional burners 17. Combustion fuel is supplied to the burners through pipes 18. The burners are rotatable and may be adjusted to project the heating gases onto the surfaces of the tubes into various parts of the combustion chamber in order to obtain the desired heat distribution. Additional burners 17a positioned in the annular space between the inner and outer tube banks are supplied at the top of the combustion chamber for a more accurate heat control. The combustion gases rise upwardly and are discharged from the furnace through a stack or flue 19.

As shown in Fig. 1, the refractory material forming the top of the combustion chamber has a centrally located, upstanding neck 12a which comprises the lower portion of the stack 19. The tubes of the inner bank 13 are substantially longer than the tubes of the outer bank 14 and the upper portions thereof extend into the throat of neck 12a.

A fluid inlet 13a connects with the inner bank of heat exchange tubes 13 and a fluid outlet 14a connects with the outer bank of heat exchange tubes 14, the two banks of tubes 13 and 14 being connected by a cross connection 19. The arrangement is such that fluid delivered to the furnace through inlet 13a will traverse the inner bank of tubes 13 before being conducted by pipe 19 to the outer bank of tubes 14. The fluid then traverses the outer bank of tubes and is discharged from the furnace through outlet 14a. As the combustion gases rise within the furnace, they give up heat to the fluid in the heat exchange tubes.

Since the fluid is usually delivered to the furnace in a relatively cool condition, the fluid traversing the inner bank of tubes 13 will be relatively cooler than the fluid traversing the outer bank of tubes 14. By the time the fluid has passed through the outer bank of tubes, it is in a relatively heated condition.

In order to obtain a more even distribution of radiant heat upon the inner bank of tubes 13, a radiating cone 20 is suspended in the upper portion of the combustion chamber by brackets 21 and within the compass of the inner bank of tubes 13. As shown in Fig. 1, the cone is disposed substantially below the top of the combustion chamber. However, a cylindrical baffle 20a of refractory material surmounting the cone extends into the throat of neck 12a. This baffle cooperates with neck 12a to provide an annular space 22 into which the upper portions of the inner heat exchange tubes 13 extend. The cone 20 besides reflecting heat from the burning gases against the inner bank of heat exchange tubes also deflects the gases into the annular space 22 so that they flow around the upper portions of the inner heat exchange tubes 13. The portions of tubes 13 extending into the annular space 22 may have radial fins 23 which offer increased heat absorption surface.

All of the combustion gases must pass through annular space 22 before entering the flue 19. Since the fluid to be heated first traverses the inner bank of tubes 13, the fluid in these tubes is relatively cool and capable of absorbing considerably greater quantities of heat than the fluid traversing the outer bank of tubes 14.

It may thus be seen that we have accomplished the objects of our invention. By providing inner and outer banks of vertical tubes concentrically arranged, firing said banks within the inner bank and at the top and bottom of the annular space between the banks, controlling direction and ratio of firing the burners and by controlling the fluid flow through the respective banks we are able to obtain wide variations in the temperature gradient of fluid being heated together with a high degree of efficiency.

It is to be understood that the form of our invention herewith shown and described is to be taken as a preferred example of the same and that various changes in the size, shape and arrangement of parts may be resorted to without departing from the spirit of our invention or the scope of the appended claims.

Having thus described our invention, we claim:

1. In a furnace construction, a wall of refractory material providing a combustion chamber, a flue passage opening through the top of the combustion chamber, inner and outer banks of interconnected heat exchange tubes within the combustion chamber, the upper portion of the inner bank of tubes extending into the flue passage, and a deflector within the inner bank of heat exchange tubes for directing the discharging combustion gases about the inner bank of tubes and intimately into contact with the portions thereof projecting into the flue passage.

2. In a furnace construction, a wall of refractory material providing a combustion chamber, a flue passage opening through the top of the combustion chamber, inner and outer banks of interconnected heat exchange tubes within the combustion chamber, the upper portion of the inner bank of tubes extending into the flue passage, a deflector within the inner bank of heat exchange tubes for directing the combustion gases intimately about the portions of the tubes projecting into the flue passage, and extended surfaces on the portions of the inner bank of tubes projecting into the flue passage for increasing heat absorption.

3. In a furnace construction, the combination with a combustion chamber surrounded by enclosing walls of refractory material having a source of combustion gases and an outlet flue, a baffle within the chamber separating it into zones of radiant and convection heat, a bank of plain surfaced heat exchange tubes located entirely within the combustion chamber, said bank arranged around the interior wall and extending the full height of said combustion chamber and subjected principally to radiant heat, and a second bank of heat exchange tubes having portions thereof located in the radiant zone and portions in the convection zone, said tube portions in the radiant zone being plain surfaces and said portions in the convection zone having extended surfaces.

JOHN S. WALLIS.
JOHN W. THROCKMORTON.